US008549986B2

(12) United States Patent
Farmer

(10) Patent No.: US 8,549,986 B2
(45) Date of Patent: Oct. 8, 2013

(54) ENERGY STORAGE DEVICE, ACTUATOR AND METHOD

(75) Inventor: Jack David Farmer, Dickinson, TX (US)

(73) Assignee: Baker Hughes Incorporated, Houston, TX (US)

( * ) Notice: Subject to any disclaimer, the term of this patent is extended or adjusted under 35 U.S.C. 154(b) by 855 days.

(21) Appl. No.: 12/754,648

(22) Filed: Apr. 6, 2010

(65) Prior Publication Data
US 2011/0239639 A1  Oct. 6, 2011

(51) Int. Cl.
*F16J 15/16* (2006.01)
*F16K 31/122* (2006.01)

(52) U.S. Cl.
USPC ..................... 92/130 A; 166/323

(58) Field of Classification Search
USPC ........ 60/398, 413, 415; 92/52, 53, 81, 130 A, 92/130 B; 166/319, 323, 373
See application file for complete search history.

(56) References Cited

U.S. PATENT DOCUMENTS

| | | | |
|---|---|---|---|
| 5,178,360 A | | 1/1993 | Young |
| 6,293,342 B1 | * | 9/2001 | McGarian et al. ............ 166/317 |
| 7,909,095 B2 | * | 3/2011 | Richards et al. ......... 166/250.08 |
| 8,162,066 B2 | | 4/2012 | Farmer et al. |

FOREIGN PATENT DOCUMENTS

| | | |
|---|---|---|
| EP | 1270958 B1 | 5/2007 |
| JP | 52-107475 A | 9/1977 |
| JP | 2003172311 A * | 6/2003 |

OTHER PUBLICATIONS

H.A. Gari et al., "Modelling and simulation of a poassive condensate heat pipe pumping system for solar energy applications"; Heat Recovery systems and CHP; vol. 8, Issue 6, 1988, Abstract; Available online Mar. 4, 2003.
Perry Y. Li et al., "Open Accumulator Concept for Compact Fluid Power energy Storage," ASME 2007 International Mechanical Engineering Congree and R&D Exposition; Nov. 11-15, 2007.
Jessica Neumiller et al., Feasibility of Using Wind Energy and CAES Systems in a Variety of Geologic Systems, Jun. 2009.
Notification of Transmittal of the International Search Report and the Written Opinion; PCT/US2011/031398; Korean Intellectual Property Office; Mailed Dec. 28, 2011; pp. 1-12.

* cited by examiner

*Primary Examiner* — Thomas E Lazo
(74) *Attorney, Agent, or Firm* — Cantor Colburn LLP

(57) ABSTRACT

An energy storage device a first member and a second member that is slidably engaged with the first member. There are at least two seals that slidably seal the first member to the second member and define a cavity therebetween that varies in volume with relative movement between the first member and the second member. The first member is biased toward the second member in a direction that resisted increases in volume of the cavity.

20 Claims, 1 Drawing Sheet

ENERGY STORAGE DEVICE, ACTUATOR AND METHOD

BACKGROUND

Energy storage devices that rely on a pressurized gas in a chamber are well known and work well for their intended purpose. Over an extended period of time, however, leakage of the gas filled chamber can cause the energy stored to dissipate even to the point of having inadequate energy to actuate an actuator in operable communication with the energy storage device. Devices and methods, therefore, to overcome the aforementioned drawback would be well received in industry.

BRIEF DESCRIPTION

Disclosed herein is an energy storage device. The storage device includes a first member and a second member that is slidably engaged with the first member. There are at least two seals that slidably seal the first member to the second member and define a cavity therebetween that varies in volume with relative movement between the first member and the second member. The first member is biased toward the second member in a direction that resisted increases in volume of the cavity.

Further disclosed is an actuator including a first member and a second member slidably sealingly engaged therewith. The first member is biased toward the second member. A cavity, defined between the first member and the second member, varies in volume with relative movement therebetween, and a port is in fluidic communication with the cavity.

Further disclosed is a method of storing and releasing energy which includes pumping fluid into a cavity defined between a first member slidably sealingly engaged with a second member, increasing a volume of the cavity, moving the first member relative to the second member, biasing the first member toward the second member, and releasing fluid from the cavity and allowing the first member to move relative to the second member.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
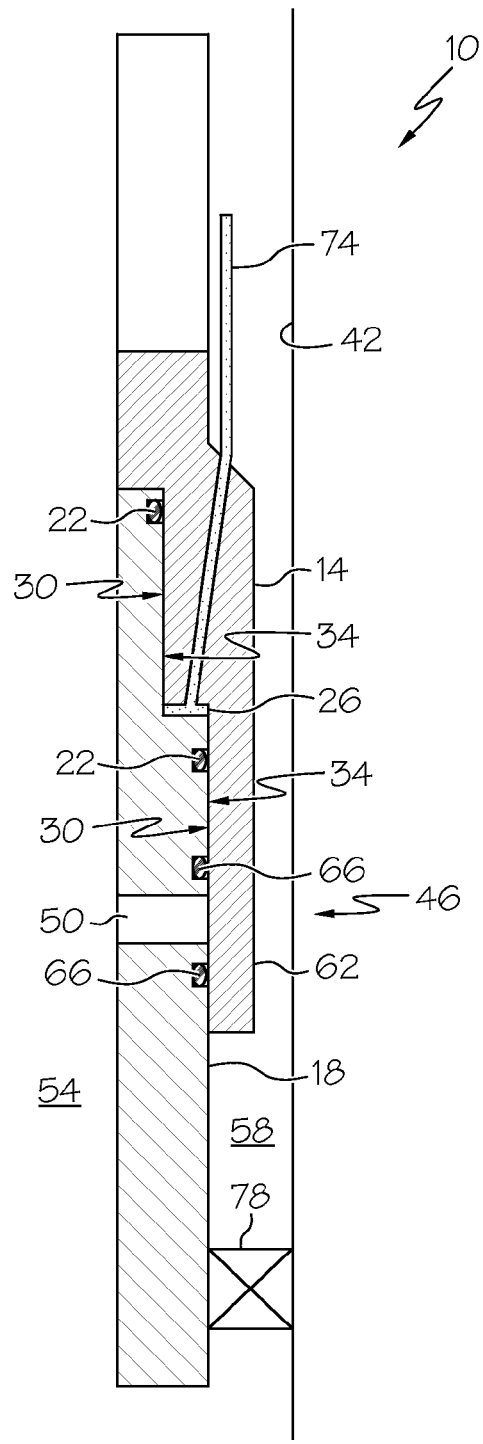
FIG. 1 depicts a partial cross sectional view of an energy storage device disclosed herein.
Figure 2:
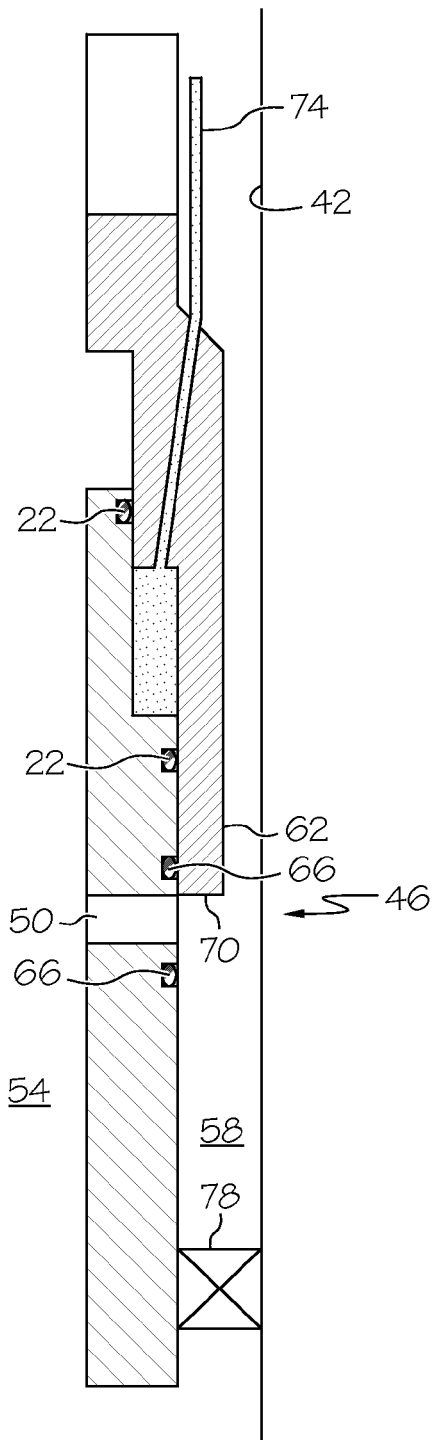
FIG. 2 depicts the partial cross sectional view of the energy device of FIG. 1 at a higher level of energy storage than in FIG. 1.

Referring to FIGS. 1 and 2, an embodiment of an energy storage device disclosed herein is illustrated at 10. The energy storage device 10 includes, a first member 14, shown herein is a first tubular, a second member 18, shown herein as a second tubular that is slidably engaged with the first tubular 14, two seals 22 and a cavity 26. The cavity 26 is defined by an annular space between the two seals 22 and inner surface 30 of the first tubular 14 and outer surface 34 of the second tubular 18. The seals 22 slidably sealingly engage with the inner surfaces 30 thereby allowing the first tubular 14 to move longitudinally relative to the second tubular 18 altering a volume of the cavity 26 in the process. In this embodiment the first tubular 14 is positioned above the second tubular 18 such that when it moves longitudinally away from the second tubular 18 it is moving in a direction substantially opposite gravity thereby increasing potential energy in the device 10 since the weight of the first tubular 14 has been raised. This potential energy can be released at a later time to do work such as actuating a tool connected thereto as will be described in detail below.

In the embodiment illustrated herein the energy storage device 10 is employed as an actuator in a wellbore 42 of a downhole application. The actuator 10 is connected to a safety valve 46 that includes a port 50 through the second tubular 18 that fluidically connects an inside 54 of the second tubular 18 to an outside 58. A sleeve 62 connected to the first tubular 14 is slidingly sealably engaged with the outer surface 34 by seals 66 illustrated herein as o-rings. Since one of the seals 66 is farther from a gravitational source relative to the port 50 and the other seal 66 is closer to a gravitational source than the port 50, the port 50 is fully closed when the sleeve 62 is sealingly engaged with both seals 66, as illustrated in FIG. 1, and is open when the sleeve 62 is moved in a direction substantially opposing gravity so that an end 70 of the sleeve 62 is above the port 50, as illustrated in FIG. 2.

A line 74, such as a hydraulic line, connected to a remote source of fluid is employed in this embodiment to actuate the valve 46. The valve 46, being a downhole safety valve, as shown, is configured to open in response to fluid being pumped into the cavity 26 thereby increasing a volume of the cavity 26. With the second tubular 18 being fixedly attached to the wellbore 42 by a packer 78 the increase in volume of the cavity 26 causes a movement of the first tubular 14 substantially against a direction of gravity and thereby an increase in potential energy stored in the first tubular. Consequently, a rupture of the line 74 permits fluid to escape from the cavity 26 and a gravity based automatic closing of the safety valve 46.

Alternate embodiments are contemplated wherein the bias of the first tubular 14 toward the second tubular 18 is due to factors other than gravity. For example, in a highly deviated or horizontal wellbore weight of the first tubular 14 may not be sufficient, or at least not sufficient alone, to cause the first tubular 14 to move toward the second tubular 18. Instead, the first tubular 14 may be biased toward the second tubular 18 by other means, such as by compressive forces distributed throughout the first tubular 14, for example. Such compressive forces may increase due to increases in volume of the cavity 26 that cause the first tubular 14 to move away from the second tubular 18. As such, biasing forces from such compression act differently than those generated by gravity alone. Gravity alone forces remain the same but are able to act over a longer stroke length in response to lifting of the first tubular 14. With the compressive forces, however, not only is the stroke length increased due to movement of the first tubular 14 but the biasing forces themselves also increase. As such even more energy can be stored in the compressively biased energy storage device 10 than in the gravity biased storage device 10. In this alternate embodiment, the increase in energy stored in relation to movement between the first tubular 14 and the second tubular 18 is nonlinear.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed:

1. An energy storage device comprising:
   a first member;
   a second member slidably engaged with the first member, the first member being biased toward the second member; and
   at least two seals slidably sealing the first member to the second member and defining a cavity therebetween that varies in volume with relative movement between the first member and the second member and the bias on the first member toward the second member resisted increases in volume of the cavity, and movement of the first member relative to the second member increases energy stored nonlinearly.

2. The energy storage device of claim 1, further comprising a port in fluidic communication with the cavity to permit flow of fluid into and out of the cavity.

3. The energy storage device of claim 1, wherein at least one of the first member and the second member is a tubular.

4. The energy storage device of claim 1, wherein the nonlinearity of energy storage includes at least two different rates of energy storage in response to relative movement between the first member and the second member.

5. The energy storage device of claim 1, wherein increases in volume of the cavity cause the first member to move in a direction opposing gravity.

6. The energy storage device of claim 1, wherein gravitational forces generate the bias.

7. The energy storage device of claim 1, wherein the second member is positioned closer to a gravitational source than the first member.

8. An actuator comprising:
   a first member;
   a second member slidably sealingly engaged with the first member defining a cavity therebetween that varies in volume with relative movement between the first member and the second member, the first member being biased toward the second member with at least two different rates of change in bias in response to movement of the first member relative to the second member; and
   a port in fluidic communication with the cavity.

9. The actuator of claim 8 wherein the actuator actuates in response to movement between the first member and the second member.

10. The actuator of claim 8, wherein the actuatable movement is reversible.

11. The actuator of claim 8, wherein the actuator is configured to increase a volume of the cavity in response to fluid being pumped into the cavity via the port.

12. The actuator of claim 8, wherein the bias increases in response to movement of the first member away from the second member.

13. The actuator of claim 8, wherein the bias of the first member toward the second member is at least in part due to gravitational forces acting on the first member toward the second member.

14. The actuator of claim 8, wherein the actuator is configured to automatically actuate through leakage of fluid from the cavity or the port.

15. The actuator of claim 8, wherein at least two seals slidably seal the first member to the second member.

16. The actuator of claim 8, wherein the first member and the second member are connectable to a target tool.

17. A method of storing and releasing energy comprising:
   pumping fluid into a cavity defined between a first member slidably sealingly engaged with a second member;
   increasing a volume of the cavity;
   moving the first member relative to the second member;
   biasing the first member toward the second member with gravity alone;
   biasing the first member toward the second member with gravity and compression of the first member; and
   releasing fluid from the cavity and allowing the first member to move relative to the second member.

18. The method of storing and releasing energy of claim 17, further comprising increasing energy stored by the moving of the first member relative to the second member.

19. The method of storing and releasing energy of claim 17, further comprising releasing energy stored by releasing fluid from the cavity.

20. The method of storing and releasing energy of claim 17, wherein the moving the first member relative to the second member includes lifting the first member.

* * * * *